(12) United States Patent
DePue et al.

(10) Patent No.: US 12,338,814 B2
(45) Date of Patent: Jun. 24, 2025

(54) FUEL PUMP

(71) Applicant: Motor Components, LLC, Elmira Heights, NY (US)

(72) Inventors: Michael Robert DePue, Greene, NY (US); Kenneth Fred Seager, Sr., Big Flats, NY (US)

(73) Assignee: MOTOR COMPONENTS, LLC, Elmira Heights, NY (US)

( * ) Notice: Subject to any disclaimer, the term of this patent is extended or adjusted under 35 U.S.C. 154(b) by 819 days.

(21) Appl. No.: 16/978,070

(22) PCT Filed: May 21, 2020

(86) PCT No.: PCT/US2020/033948
§ 371 (c)(1),
(2) Date: Sep. 3, 2020

(87) PCT Pub. No.: WO2020/242873
PCT Pub. Date: Dec. 3, 2020

(65) Prior Publication Data
US 2023/0096698 A1 Mar. 30, 2023

Related U.S. Application Data

(60) Provisional application No. 62/854,368, filed on May 30, 2019.

(51) Int. Cl.
*F04B 53/20* (2006.01)
*F04B 17/04* (2006.01)
(Continued)

(52) U.S. Cl.
CPC ............ *F04B 53/20* (2013.01); *F04B 17/046* (2013.01); *F04B 49/06* (2013.01); *F04B 53/10* (2013.01); *F04B 53/16* (2013.01); *F04B 53/22* (2013.01)

(58) Field of Classification Search
CPC .......... F04B 17/04; F04B 53/10; F04B 53/12; F04B 53/124; F04B 53/125–129;
(Continued)

(56) References Cited

U.S. PATENT DOCUMENTS 2,472,067 A 6/1949 Dickey et al.
2,488,384 A * 11/1949 Dickey ................. F04B 17/046
310/34

(Continued)

FOREIGN PATENT DOCUMENTS

DE 4205290 A1 8/1993
EP 2551522 A2 1/2013
(Continued)

OTHER PUBLICATIONS

Notice of Preliminary Rejection dated Oct. 30, 2024, KR Patent Application No. 10-2021-7039404.

*Primary Examiner* — Kenneth J Hansen
*Assistant Examiner* — Chirag Jariwala
(74) *Attorney, Agent, or Firm* — Simpson & Simpson, PLLC

(57) ABSTRACT

A fuel pump, including a case, including a first section including a hub and a hole, a second section circumferentially arranged around the first section, wherein a radial space is arranged between the first section and the second section, an inlet in fluid communication with the radial space, a housing chamber arranged adjacent to the first section, and an outlet in fluid communication with the hole, a filter bowl removably connected to the second section, the filter bowl fluidly connecting the radial space with the hole, a valve assembly arranged at least partially in the first section and at least partially in the housing chamber, and a coil operatively arranged to apply a magnetic field to the valve assembly to selectively displace fluid therethrough.

17 Claims, 6 Drawing Sheets

(51) Int. Cl.
*F04B 49/06* (2006.01)
*F04B 53/10* (2006.01)
*F04B 53/16* (2006.01)
*F04B 53/22* (2006.01)

(58) Field of Classification Search
CPC .......... F04B 53/20; F04B 53/16; F04B 53/22; F04B 49/06; H02K 33/02; B01D 35/005; B01D 35/02; B01D 2201/20; B01D 2201/202
USPC .......... 210/167.01, 171, 258, 416.4
See application file for complete search history.

(56) References Cited

U.S. PATENT DOCUMENTS

| | | | | |
|---|---|---|---|---|
| 2,706,795 | A | * | 4/1955 | Dickey .................. H02K 33/10 310/34 |
| 2,804,211 | A | * | 8/1957 | Kennedy ................ B01D 35/06 210/434 |
| 2,833,221 | A | | 5/1958 | Dickey |
| 3,000,321 | A | * | 9/1961 | Parker ..................... F02B 1/00 417/540 |
| 3,293,516 | A | * | 12/1966 | Maier .................... H02K 33/10 310/34 |
| 3,361,069 | A | * | 1/1968 | Long ..................... F04B 53/129 417/417 |
| 3,556,684 | A | * | 1/1971 | Rouquette ............. F02M 51/04 417/307 |
| 4,047,852 | A | | 9/1977 | O'Connor et al. |
| 4,086,518 | A | | 4/1978 | Wilkinson |
| 4,909,712 | A | * | 3/1990 | Mortensen ........... F04B 17/046 310/15 |
| 6,190,139 | B1 | | 2/2001 | Isozumi et al. |
| 6,345,608 | B1 | | 2/2002 | Rembold et al. |
| 6,447,273 | B1 | | 9/2002 | Nishimura et al. |
| 7,163,623 | B2 | | 1/2007 | Knight |
| 7,398,768 | B2 | | 7/2008 | Usui et al. |
| 7,603,986 | B2 | | 10/2009 | Ricco et al. |
| 9,951,730 | B2 | | 4/2018 | Kasper |
| 10,655,585 | B2 | | 5/2020 | Usui et al. |
| 11,255,318 | B2 | | 2/2022 | Gibson et al. |
| 2002/0125188 | A1 | * | 9/2002 | Hacker ................ B01D 35/306 210/450 |
| 2005/0089418 | A1 | * | 4/2005 | Bonfardeci ........... F04B 17/046 417/417 |
| 2005/0175481 | A1 | | 8/2005 | Harbuck |
| 2006/0239846 | A1 | | 10/2006 | Oda et al. |
| 2009/0297375 | A1 | | 12/2009 | Inoue |
| 2013/0028753 | A1 | * | 1/2013 | Moreira-Espinoza ...................... F04B 17/046 417/53 |
| 2013/0098339 | A1 | | 4/2013 | Yoon et al. |
| 2014/0255219 | A1 | | 9/2014 | Lucas |
| 2017/0248110 | A1 | | 8/2017 | Hashida et al. |
| 2018/0010600 | A1 | | 1/2018 | Spakowski |
| 2018/0252191 | A1 | * | 9/2018 | Pitcel ..................... F04B 17/03 |
| 2018/0320673 | A1 | * | 11/2018 | Haffenden ........... F04B 49/065 |
| 2018/0355830 | A1 | | 12/2018 | Landenberger |
| 2019/0107106 | A1 | | 4/2019 | Hagihara |
| 2019/0112959 | A1 | | 4/2019 | Xi et al. |
| 2019/0145393 | A1 | | 5/2019 | Gibson et al. |
| 2019/0203684 | A1 | | 7/2019 | Mikhaylov et al. |

FOREIGN PATENT DOCUMENTS

| | | |
|---|---|---|
| JP | H10-176669 | 6/1998 |
| JP | 2019031977 | 2/2019 |
| KR | 10-2019-0053779 | 5/2019 |
| WO | WO2018019483 | 2/2018 |

\* cited by examiner

FUEL PUMP

CROSS-REFERENCE TO RELATED APPLICATIONS

This application is the United States National Stage Application pursuant to 35 U.S.C. § 371 of International Patent Application No. PCT/US2020/033948, filed on May 21, 2020, which application claims priority to U.S. Provisional Patent Application No. 62/854,368, filed on May 30, 2019, which applications are hereby incorporated by reference in their entireties.

FIELD

The present disclosure relates to fuel pumps, and more particularly, to solenoid actuated fuel pumps.

BACKGROUND

A fuel pump is a frequently (but not always) essential component on a car or other internal combustion engine device. Many engines (older motorcycle engines in particular) do not require any fuel pump at all, requiring only gravity to feed fuel from the fuel tank or under high pressure to the fuel injection system. Often, carbureted engines use low pressure mechanical pumps that are mounted outside the fuel tank, whereas fuel injected engines often use electric fuel pumps that are mounted inside the fuel tank (and some fuel injected engines have two fuel pumps: one low pressure/high volume supply pump in the tank and one high pressure/low volume pump on or near the engine). Fuel pressure needs to be within certain specifications for the engine to run correctly. If the fuel pressure is too high, the engine will run rough and rich, not combusting all of the fuel being pumped making the engine inefficient and a pollutant. If the pressure is too low, the engine may run lean, misfire, or stall.

Plunger-type pumps are a type of positive displacement pump that contain a pump chamber whose volume is increased and/or decreased by a plunger moving in and out of a chamber full of fuel with inlet and discharge stop-check valves. It is similar to that of a piston pump, but the high-pressure seal is stationary while the smooth cylindrical plunger slides through the seal. These pumps typically run at a higher pressure than diaphragm type pumps. A spring is used to pull the plunger outward creating a lower pressure pulling fuel into the chamber from the inlet valve.

Typically, back pressure is present at the outlet port of a solenoid pump and limits operation of the pump, that is, the pump can operate only up to a certain back pressure level. In general, the back pressure works against the spring used to bias the plunger. For example, when the back pressure is greater than the biasing force of the spring, the pumping cycle is terminated (the plunger cannot return to a "rest" position when the coil is de-energized). The known use of linear springs limits the back pressure under which known solenoid pumps can operate. The spring biasing force must be relatively lower to enable the initiation of the plunger displacement when the coil is energized. Since the spring is linear, only the same relatively lower biasing force is available to counteract the back pressure. Known solenoid pumps cannot operate with a backpressure over about 10 psi.

Known solenoid pumps are difficult to assemble and can be large or bulky. Additionally, known solenoid pumps must be totally removed from its rather permanent plumbing in order that it be serviced (i.e., to replace the filter therein).

Thus, there is a long-felt need for a solenoid fuel pump that is compact, easy to assemble, and can be serviced without being removed from its plumbing. There is also a long-felt need for a solenoid pump, the timing of which can be controlled via a microcontroller and/or an external signal source. There is also a long-felt need for a solenoid pump that is entirely watertight and prevents the ingress of water and other foreign substances around the lead wires.

SUMMARY

According to aspects illustrated herein, there is provided a fuel pump, comprising a case, including a first section comprising a hub and a hole, a second section circumferentially arranged around the first section, wherein a radial space is arranged between the first section and the second section, an inlet in fluid communication with the radial space, a housing chamber arranged adjacent to the first section, and an outlet in fluid communication with the hole, a filter bowl removably connected to the second section, the filter bowl fluidly connecting the radial space with the hole, a valve assembly arranged at least partially in the first section and at least partially in the housing chamber, and a coil operatively arranged to apply a magnetic field to the valve assembly to selectively displace fluid therethrough.

In some embodiments, the fuel pump further comprises a bobbin arranged concentrically around the valve assembly, wherein the coil is arranged concentrically around the bobbin. In some embodiments, the fuel pump further comprises a first metal pole arranged on a first axial side of the coil, a second metal pole arranged on a second axial side of the coil, opposite the first axial side, and a metal sleeve arranged circumferentially around the coil. In some embodiments, the fuel pump further comprises a circuit connected to the coil. In some embodiments, the circuit comprises a microcontroller operatively arranged to control current supplied to the coil. In some embodiments, the case further comprises a port electrically connected to the circuit. In some embodiments, the valve assembly comprises a fuel chamber tube including a first end and a second end, a check valve assembly arranged in the fuel chamber tube at the first end, and a plunger assembly slidably arranged in the fuel chamber tube at the second end. In some embodiments, the check valve assembly comprises a first seat including a first side and a second side, a first component axially spaced from the first seat, a check valve displaceably arranged between the first seat and the first component, and a first spring operatively arranged to bias the check valve in a first axial direction, towards the first seat. In some embodiments, the check valve assembly further comprises a seal, the seal being integrally formed and engaged with both the first side and the second side of the first seat. In some embodiments, the plunger assembly comprises a tube including a second seat, a third seat, and a through-bore, a fourth seat engaged with the second seat and including a radially inward facing surface, a second component engaged with the second seat, and a plunger displaceably arranged between the fourth seat and the second component. In some embodiments, the check valve assembly further comprises a second spring arranged in a fuel chamber between the check valve assembly and the plunger assembly to bias the plunger assembly in a second axial direction, opposite the first axial direction. In some embodiments, the second spring is frusto-conical. In some embodiments, when the plunger assembly is displaced in the first axial direction, the check valve sealingly engages the first side of the seat and the plunger is spaced apart from the radially inward facing surface allowing fluid flow into the through-bore, and when the plunger assembly is displaced in the second axial direction, the plunger is sealingly engaged with the radially inward facing surface and the check valve is spaced apart from the second surface allowing fluid flow into the fuel chamber. In some embodiments, the fuel pump further comprises a filter engaged with the hub, wherein the filter bowl is operatively arranged to secure the filter to the case.

According to aspects illustrated herein, there is provided a fuel pump, comprising a case, including a first section comprising a hub and a hole, a second section concentrically arranged around the first section, wherein a radial space is arranged between the first section and the second section, an inlet in fluid communication with the radial space, a housing chamber arranged adjacent to the first section and the second section, and an outlet in fluid communication with the hole, a filter bowl removably connected to the second section, the filter bowl fluidly connecting the radial space with the hole, a valve assembly arranged at least partially in the first section and at least partially in the housing chamber, the valve assembly including a fuel chamber tube comprising a first end and a second end, a check valve assembly arranged in the fuel chamber tube at the first end, and a plunger assembly slidingly arranged in the fuel chamber tube at the second end, and a solenoid coil concentrically arranged around the plunger assembly, the solenoid coil operatively arranged to produce a magnetic field to displace the plunger assembly in a first axial direction such that fluid is selectively displaced from the inlet to the outlet.

In some embodiments, the fuel pump further comprises a circuit connected to the solenoid coil, the circuit comprising a microcontroller operatively arranged to control power supplied to the solenoid coil. In some embodiments, the check valve assembly comprises a first seat including a first side and a second side, a seal integrally formed and engaged with both the first side and the second side, a first component axially spaced from the first seat, a check valve displaceably arranged between the first seat and the first component, and a first spring operatively arranged to bias the check valve in the first axial direction, towards the first seat. In some embodiments, the plunger assembly comprises a tube including a through-bore, a second seat engaged with the tube and including a radially inward facing surface, a second component engaged with the tube, and a plunger displaceably arranged between the second seat and the second component, wherein a spring is arranged between the plunger assembly and the check valve assembly to bias the plunger assembly in a second axial direction, opposite the first axial direction. In some embodiments, when the plunger assembly is displaced in the first axial direction, the check valve sealingly engages the first side and the plunger is spaced apart from the radially inward facing surface allowing fluid flow into the through-bore, and when the plunger assembly is displaced in the second axial direction, the plunger is sealingly engaged with the radially inward facing surface and the check valve is spaced apart from the second surface allowing fluid flow into the fuel chamber tube.

According to aspects illustrated herein, there is provided a fuel pump, comprising a case, including a first section comprising a hub and a hole, a second section concentrically arranged around the first section, wherein a radial space is arranged between the first section and the second section, an inlet in fluid communication with the radial space, a housing chamber arranged adjacent to the first section and the second section, and an outlet in fluid communication with the hole, a filter removably connected to the hub, a filter bowl removably connected to the second section and operatively arranged to secure the filter to the case, the filter bowl fluidly connecting the radial space with the hole, a valve assembly arranged at least partially in the first section and at least partially in the housing chamber, the valve assembly including a fuel chamber tube comprising a first end and a second end, a check valve assembly arranged in the fuel chamber tube at the first end, and a plunger assembly slidingly arranged in the fuel chamber tube at the second end, and a solenoid coil concentrically arranged around the plunger assembly, the solenoid coil operatively arranged to produce a magnetic field to displace the plunger assembly in a first axial direction such that fluid is selectively displaced from the inlet to the outlet.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" or "non-rotatably secured" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that the elements are rotatable with respect to each other.

Moreover, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Figure 1A:
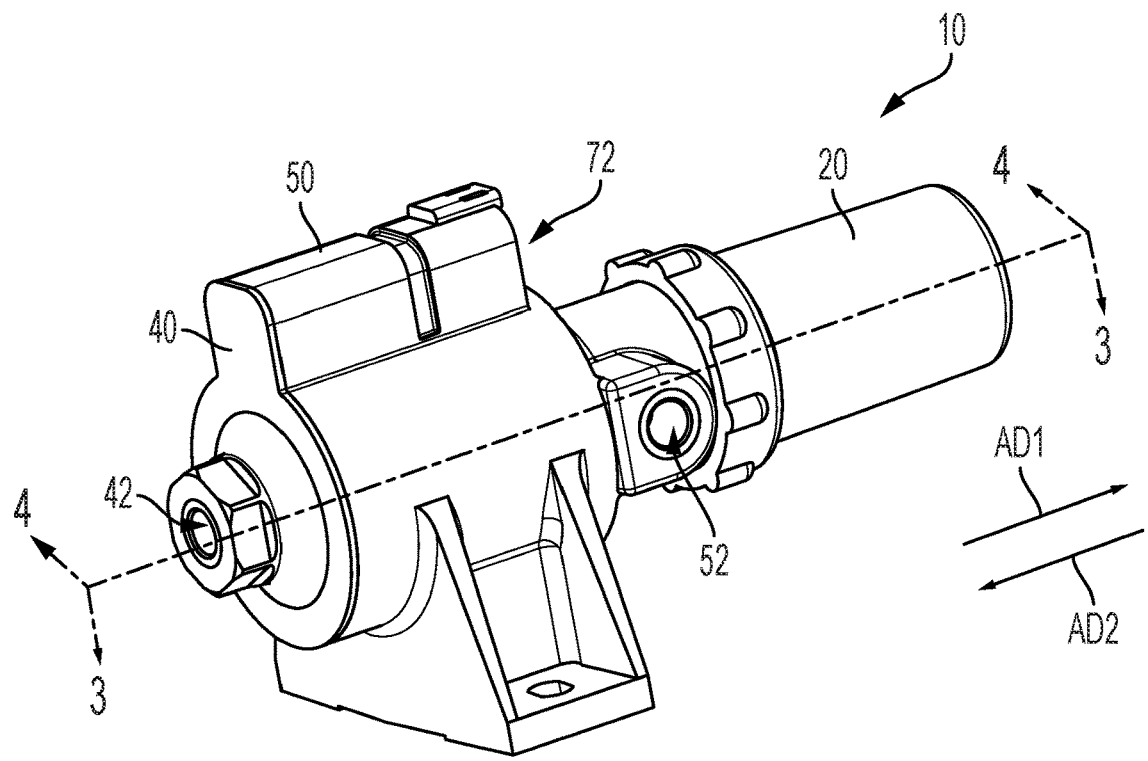
FIG. 1A is a perspective view of a fuel pump.
Figure 1B:
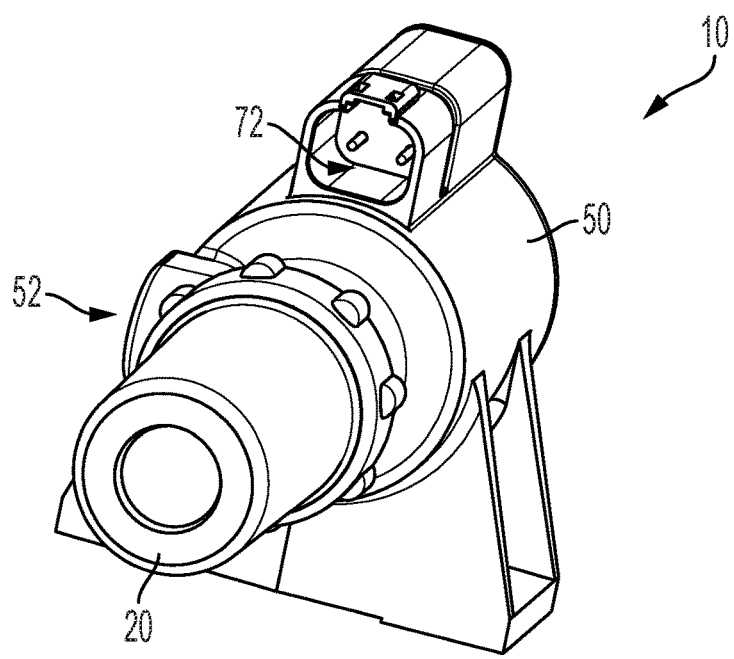
FIG. 1B is a perspective view of the fuel pump shown in FIG. 1A.
Figure 2:
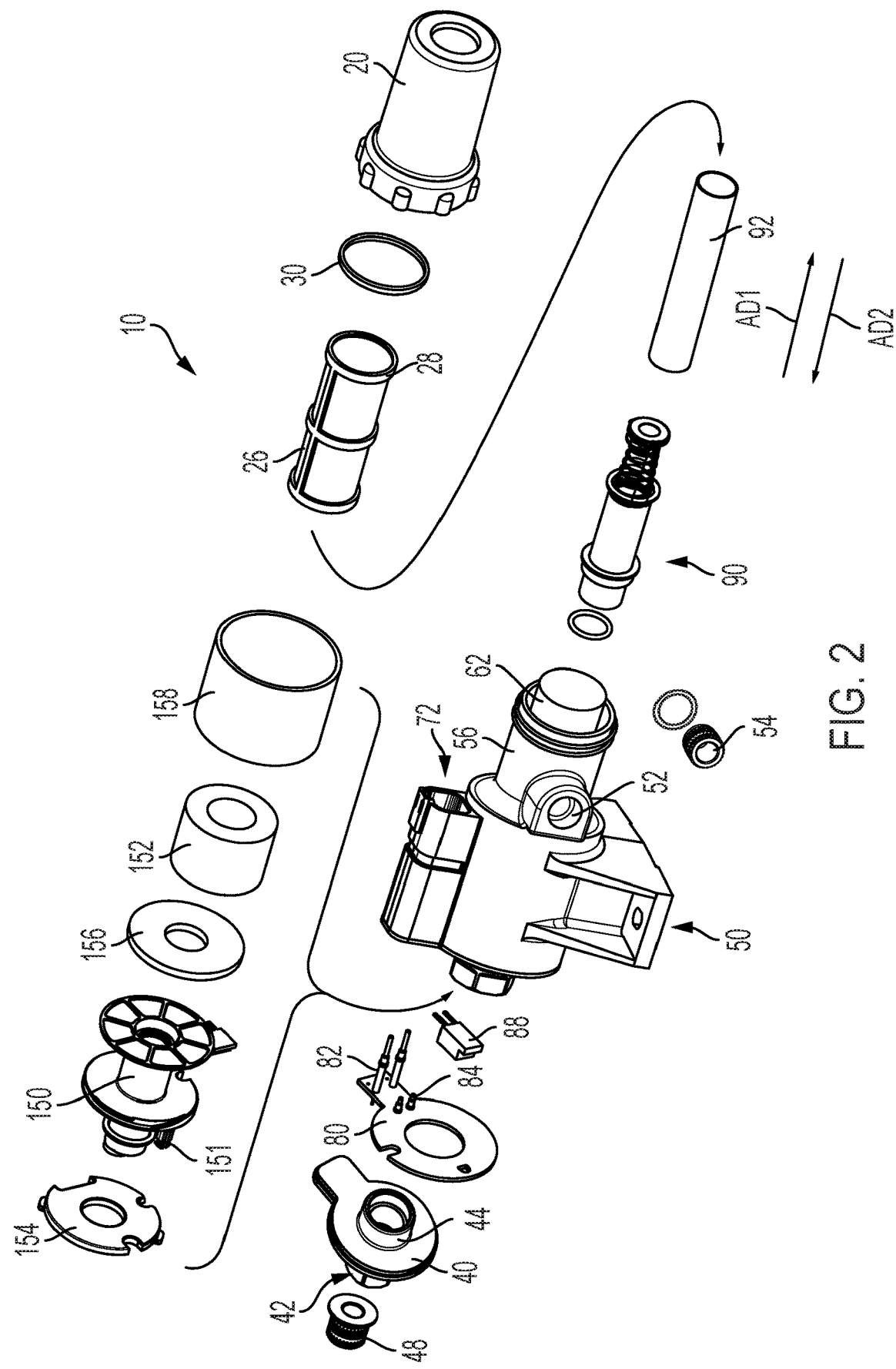
FIG. 2 is a exploded perspective view of the fuel pump shown in FIG. 1A.
Figure 3:
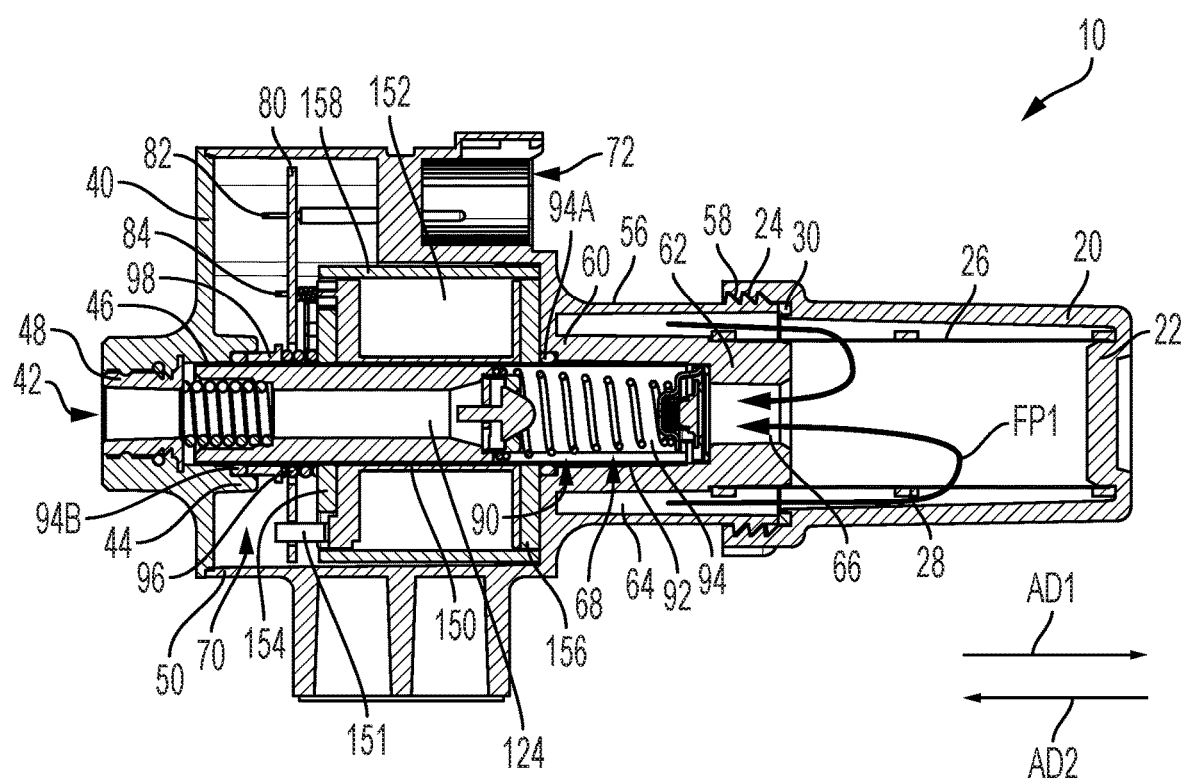
FIG. 3 is a cross-sectional view of the fuel pump taken generally along line 3-3 in FIG. 1A.
Figure 4:
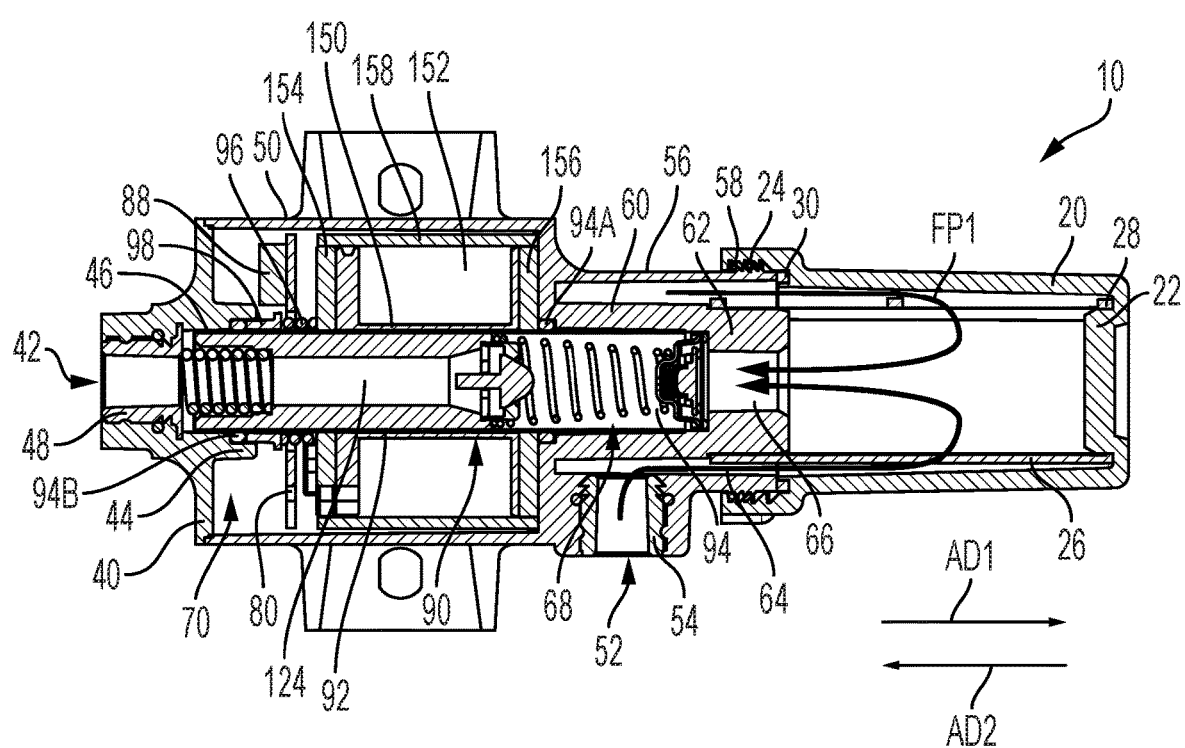
FIG. 4 is a cross-sectional view of the fuel pump taken generally along line 4-4 in FIG. 1A.

Adverting now to the figures, FIG. 1A is a perspective view of fuel pump 10. FIG. 1B is a perspective view of fuel pump 10. FIG. 2 is a exploded perspective view of fuel pump shown 10. FIG. 3 is a cross-sectional view of fuel pump 10 taken generally along line 3-3 in FIG. 1A. FIG. 4 is a cross-sectional view of fuel pump 10 taken generally along line 4-4 in FIG. 1A. Fuel pump 10 generally comprises filter bowl 20, filter 26, cover 40, case 50, circuit or circuit board 80, coil 152, and valve assembly 90. The following description should be read in view of FIGS. 1A-4.

Filter bowl 20 comprises hub 22 and threading 24. Filter bowl 20 is operatively arranged to secure filter 26 to case 50. In some embodiments, and as shown, filter bowl 20 is connected to case 50 via threading 24. Threading 24 engages threading 58 of case 50. When filter bowl 20 is connected to case 50, filter 26 is secured between hub 22 and case 50. Specifically, filter 26 engages hub 22 of filter bowl 20 and hub 62 of case 50 to ensure proper alignment and position of filter 26. As shown in FIGS. 3 and 4, filter 26 is positioned circumferentially around hub 22 and hub 62 (i.e., filter 26 is a sleeve that is slid over hub 62 and hub 22 at each end). In some embodiments, filter 26 comprises support cage 28. In such embodiments, filter 26 and support cage 28 engage hub 22 of filter bowl 20 and hub 62 of case 50 to ensure proper alignment and position of filter 26. In some embodiments, filter bowl 20 is transparent, which allows filter 26 to be seen so as to indicate when replacement is necessary. In some embodiments, filter bowl 20 is translucent. In some embodiments, filter bowl 20 is opaque. Filter bowl 20 and filter 26 are operatively arranged to be removably connected to case 50. The threaded connection between filter bowl 20 and case 50 allow for easy replacement of filter 26.

Case 50 comprises inlet 52, section 56, section 60, fuel chamber 68, and housing chamber 70. Space 64 is a radially space arranged radially between section 56 and section 60. Sections 56 and 60 are generally radial walls. Section 60 comprises hub 62, which is operatively arranged to engage filter 26, hole 66, and fuel chamber 68. In some embodiments, section 60 is frusto-conical (i.e., section 60 decreases in diameter in axial direction AD1). Section 56 is arranged radially outward of, and circumscribes, section 60. Section 56 comprises threading 58, which is arranged to threadably engage threading 24 to connect filter bowl 20 with case 50. In some embodiments, inlet 52 comprises fitting 54. In some embodiments, a longitudinal axis of inlet 52 is perpendicular to a longitudinal axis of hole 66 and outlet 42. In some embodiments, a longitudinal axis of inlet 52 is arranged at an angle with respect to a longitudinal axis of hole 66 and outlet 42, and that angle being greater than 0 degrees and less than 180 degrees. In some embodiments, fitting 54 is a metal insert and includes threading on a its radially inward facing surface. In some embodiments, fitting 54 is molded within outlet 52. In some embodiments, a seal is arranged around fitting 54 to create a seal between fitting 54 and case 50. Housing chamber 70 is arranged adjacent to fuel chamber 68. Fuel chamber 68 at least partially houses valve assembly 60. In some embodiments, seal 94A is arranged radially between valve assembly 90 and section 56. Housing chamber 70 at least partially houses valve assembly 60. Housing chamber 70 houses circuit 80, coil bobbin 150, coil 152, pole 154, and pole 156. Case 50 further comprises connector port 72 which allows an electrical connection between a power source and circuit 80, and coil 152. In some embodiments, connector port 72 may comprise a connector geometry that eliminates the need for external lead wires, for example, Deutsch connector P/N: DT04-4P. This connector geometry is arranged in such a way as to accept the connector pins, namely, terminal(s) 82, from circuit 80 that will be described in greater detail below. In some embodiments, case 50 is injection molded.

Cover 40 comprises outlet 42, protrusion 44, and recess or hole 46. Cover 40 is operatively arranged to be connected to case 50 to secure various components of fuel pump 10 therein. In some embodiments, cover 40 is connected to case 50 via ultrasonic weld; however, it should be appreciated that any suitable method for connecting cover 40 and case 50 may be used, for example, adhesives, bolts, screws, rivets, pins, nails, welding, soldering, etc. Protrusion 44 extends at least partially into housing chamber 70, in axial direction AD1, and at least partially engages valve assembly 90 via recess 46, which aligns valve assembly 90 with outlet 42. In some embodiments, outlet 42 comprises fitting 48. In some embodiments, fitting 48 is a metal insert and includes threading on a its radially inward facing surface. In some embodiments, fitting 48 is molded within outlet 42. In some embodiments, a seal is arranged around fitting 48 to create a seal between fitting 48 and cover 40. In some embodiments, seal 94B is radially arranged between recess 46 and valve assembly 90. In some embodiments, protrusion 44 engages shoulder 98. Shoulder 98 engages spring 96 to bias the electromagnet portion of fuel pump 10 in axial direction AD1. For example, spring 96 is arranged axially between shoulder 98 and pole 154 to maintain the proper positioning of coil bobbin 150, coil 152, pole 154, and pole 156 in housing chamber 70. In some embodiments, cover 40 is injection molded.

To assemble fuel pump 10, filter 26 is arranged on hub 62 and filter bowl 20 is connected to section 56, for example, via threading 24 and threading 58. Valve assembly 90 is positioned within fuel chamber 68 and housing chamber 70. The solenoid coil assembly, namely, coil bobbin 150, coil 152, pole 154, pole 156, and sleeve 158 are arranged in housing chamber 70, concentrically or radially around valve assembly 90. Circuit 80 is arranged in housing chamber 70, along with respective terminal(s) 82 and/or terminal(s) 84. In some embodiments, circuit 80 engages retainer 151 of coil bobbin 150. In some embodiments, spring 96 and shoulder 98 are arranged on valve assembly 90. In some embodiments, all of the components within case 50 are then secured therein with epoxy. Then cover 40 is connected to case 50. In some embodiments, when fuel pump 10 is fully assembled it is hermetically sealed.

The electromagnetic portion of the pump comprises coil bobbin 150, coil 152 arranged circumferentially around coil bobbin 150, pole 154 arranged on a first axial side of coil bobbin, pole 156 arranged on a second axial side of coil bobbin, and sleeve 158 arranged circumferentially around coil 152. In some embodiments, coil bobbin 150 comprises a polymer and houses solenoid coil 152. As is known in the art, a coil or solenoid or solenoid coil is a type of electromagnet the purpose of which is to generate a controlled magnetic field through a coil wound into a tightly packed helix. Thus, coil 152 is wound as a helix around coil bobbin 150, and also plunger assembly 120. When electric current is passed through coil 152, a magnetic field is produced, which in the present disclosure, then displaces plunger assembly 120 in axial direction AD1 within fuel chamber tube 92 (i.e., plunger assembly 120 is slidably arranged in fuel chamber tube 92). Since plunger assembly 120 comprises a magnetic metal (e.g., 416 stainless steel), it reacts to the magnetic field created by coil 152 (i.e., coil 152 creates a magnetic field which attracts, or opposes, the polarity of plunger assembly 120, specifically tube 122) as will be described in greater detail below. The poles 154 and 156, and sleeve 158 completely surround coil 152 in order to further direct the magnetic field toward plunger assembly 120. Specifically, pole 154 is a metal magnetic pole arranged axially adjacent to coil bobbin 150, pole 156 is a metal magnetic pole arranged axially adjacent to coil bobbin 150, and sleeve 158 is a metal magnetic sleeve arranged circumferentially around coil 152. Coil 152 is connected to two or more terminals 84. Terminals 84 are connected to circuit 80. In some embodiments, and as shown in the figures, each end of coil 152 is connected to a respective terminal 84 by way of a small helical coil (see FIG. 3). The ends of coil 152 extend out of coil bobbin 150, through an aperture in pole 154, and engage their respective terminals 84. In some embodiments, coil bobbin 150 further comprises retainer 151 which extends therefrom in axial direction AD2. Retainer 151 extends through an aperture in pole 154 and engages an aperture in circuit 80 in order to further secure circuit 80 to coil bobbin 150 (in addition to the connection via terminals 84 and coil 152).

Circuit 80 is arranged around valve assembly 90 within housing chamber 70. In some embodiments, circuit 80 comprises a circuit board. Terminals 84 are connected to circuit 80, for example, via solder. In some embodiments, circuit 80 comprises one or more terminals 82. For example, circuit 80 may have three connector terminals 82, with two of the three terminals being used to supply electricity to circuit 80 and coil 152, and the third terminal being used to supply a signal to circuit 80 from an external signal source to externally control when and for how long current is supplied to circuit 80 (i.e., without the use of or in addition to a microcontroller). Terminals 82 are connected to circuit 80, for example, via solder, and are aligned with connector port 72. Terminals 82 allow electrical connection with an external electrical connector via port 72. In some embodiments, terminals 84, circuit 80, and terminals 82 (and their connection to an external signal source, provide electrical current to coil 152. In some embodiments, circuit 80 comprises transistor 88. In some embodiments, transistor 88 connects the circuit to ground thereby allowing current to run through coil 152. In some embodiments, circuit 80 further comprises one or more microcontrollers. The microcontroller is operatively arranged to control circuit timing, for example, how long and when current is provided to coil 152. The microcontroller may also control the amount of voltage provided to coil 152. For example, the purpose of coil 152 and circuit 80 is to displace plunger assembly 120 with enough axial distance in order to pump a proper amount of fuel. To do this, there are two variables that might be considered: 1) the amount of time current is provided to coil 152 and 2) the amount of voltage provided to coil 152. For example, if a large amount of voltage is applied to coil 152, a large magnetic field will be produced and displace plunger assembly 120 a sufficient distance in a very short amount of time. If a low amount of voltage is applied to coil 152, the same sufficient displacement distance of plunger assembly 120 may still be achieved but will require that current be provided to coil 152 for a longer amount of time. The microcontroller is programmed to control these variables based on the provided voltage levels. In some embodiments, the microcontroller shuts down coil 152 (i.e., stops voltage applied to coil 152) if the input voltage exceeds a predetermined amount, for example, 18 Volts. As shown in the drawings, and specifically FIGS. 3 and 4, coil bobbin 150, coil 152, poles 154 and 156, sleeve, circuit 80, spring 96, and shoulder 98 are all arranged concentrically around valve assembly 90 (i.e., valve assembly 90 runs through, for example apertures in, each of coil bobbin 150, coil 152, poles 154 and 156, sleeve, circuit 80, spring 96, and shoulder 98).

Fuel enters fuel pump 10 through inlet 52 and enters space or chamber 64. The fuel then exits space 64 in axial direction AD1 and follows flow path FP1 through filter 26 (i.e., radially inward). Fuel then enters fuel chamber 68, specifically fuel chamber 94 of valve assembly 90, through hole 66 in section 60, in axial direction AD2. Fuel travels in axial direction AD2 through valve assembly 90 and exits fuel pump 10 through outlet 42. The displacement of fuel through valve assembly 90 will be described in greater detail below.

Figure 5:
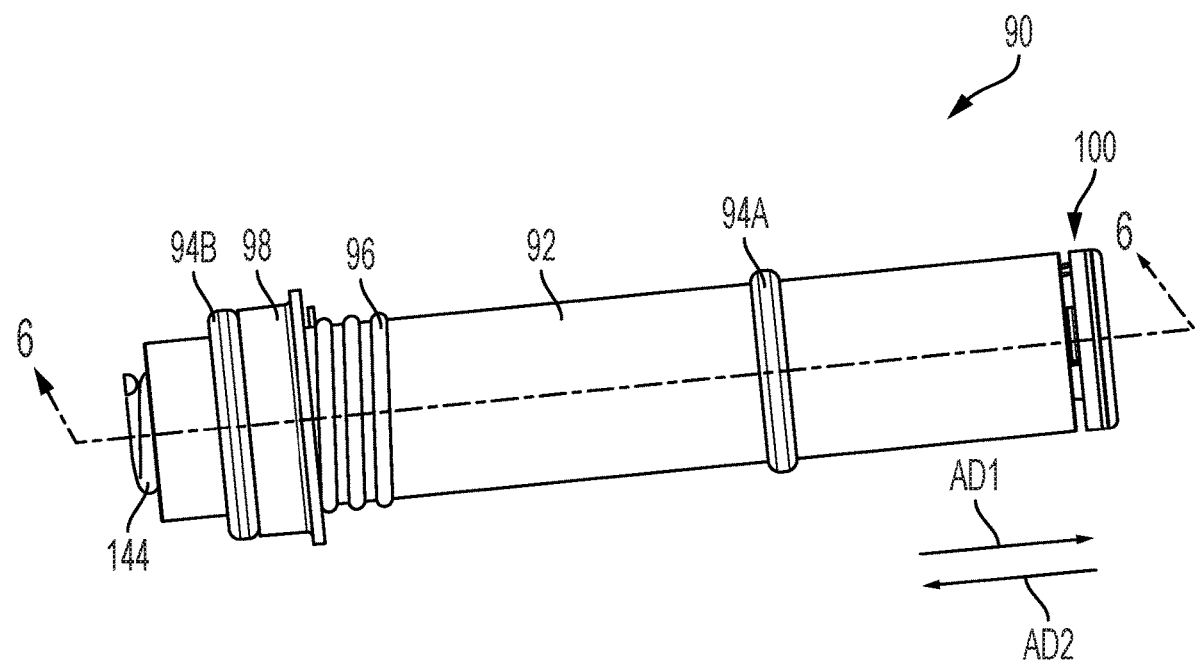
FIG. 5 is a perspective view of a valve assembly.
Figure 6:
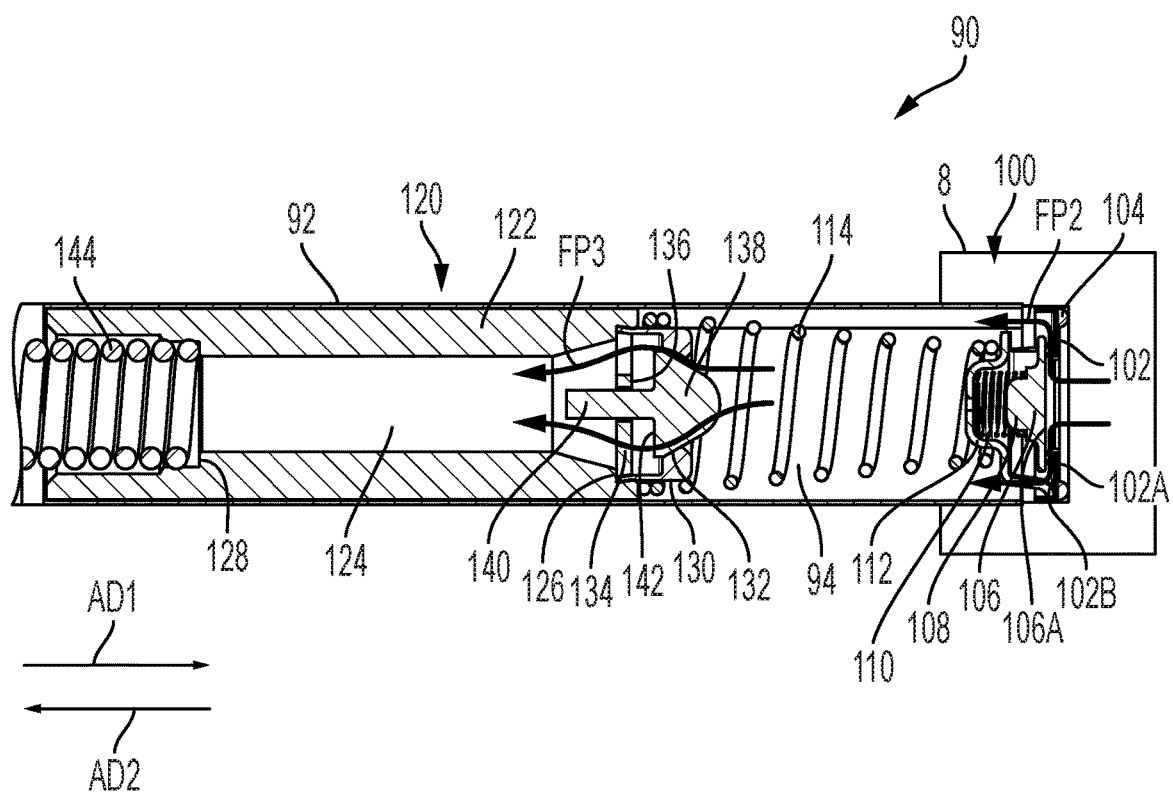
FIG. 6 is a cross-sectional view of the valve assembly taken generally along line 6-6 in FIG. 5.
Figure 7:
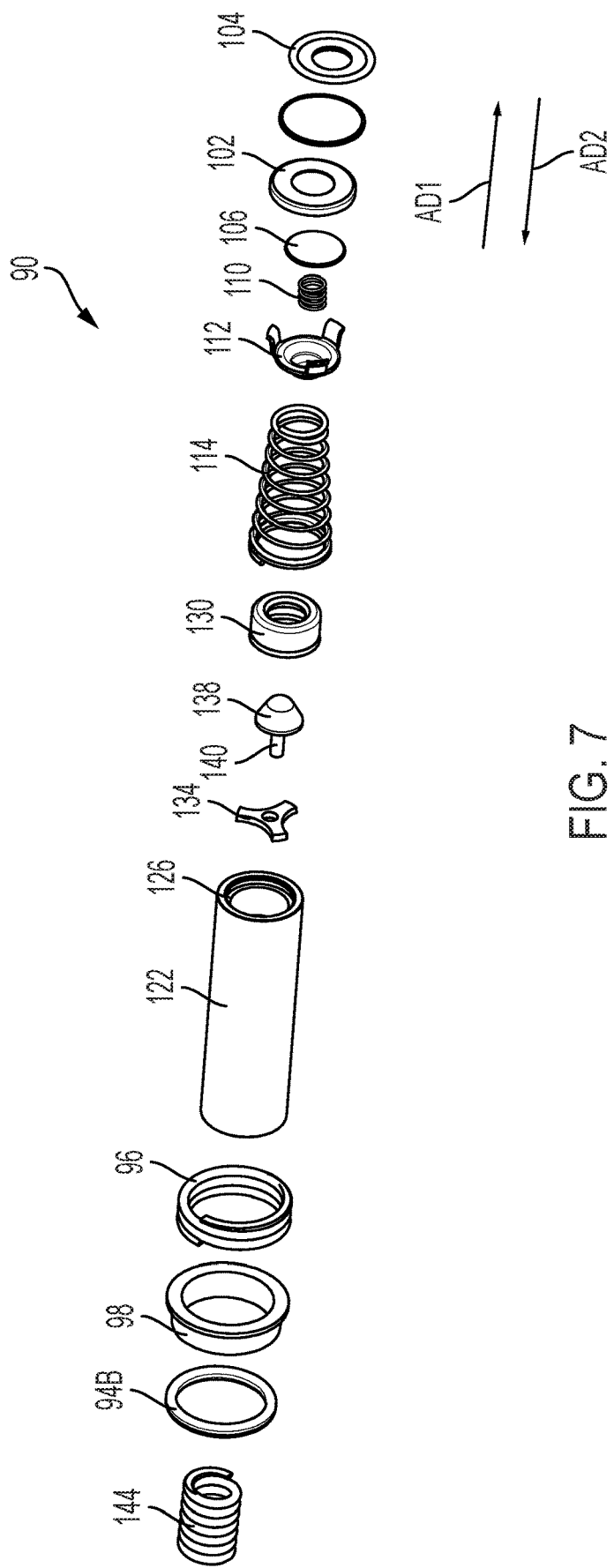
FIG. 7 is an exploded perspective view of the valve assembly shown in FIG. 5; and, FIG. 8 is a detail view of the valve assembly taken generally along detail 8 in FIG. 6.
Figure 8:
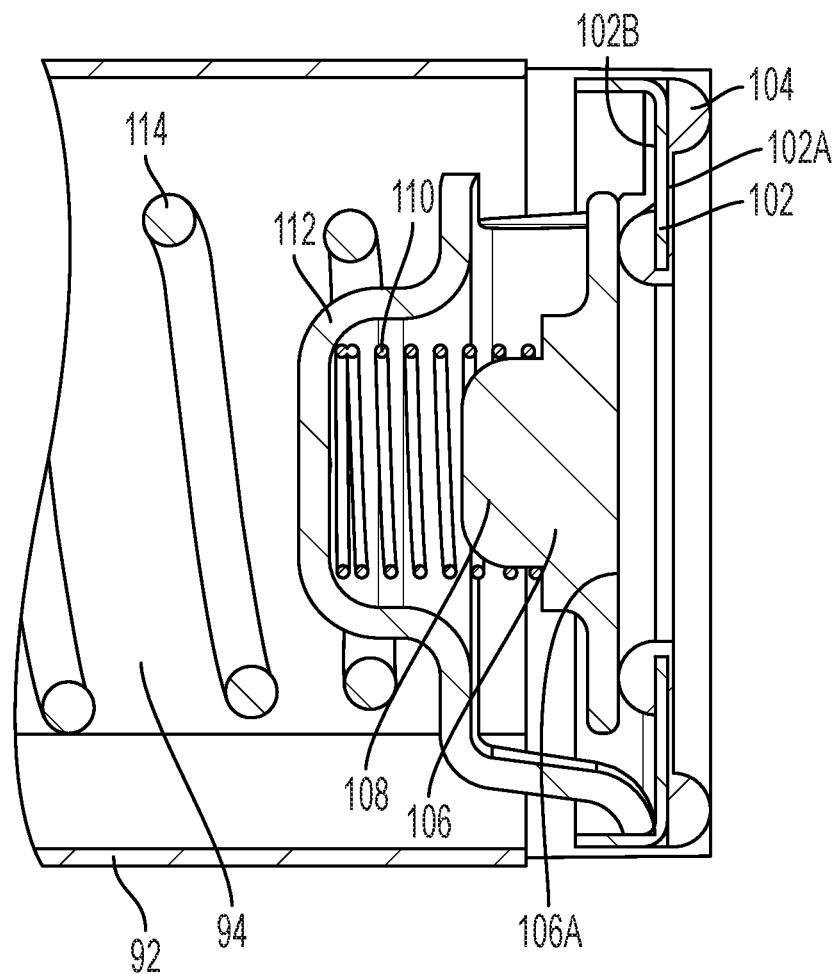

FIG. 5 is a perspective view of valve assembly 90. FIG. 6 is a cross-sectional view of valve assembly 90 taken generally along line 6-6 in FIG. 5. FIG. 7 is an exploded perspective view of valve assembly 90. FIG. 8 is a detailed view of valve assembly 90 taken generally along detail 8 in FIG. 6. Valve assembly 90 generally comprises fuel chamber tube 94, check valve assembly 100, spring 114, plunger assembly 120, and spring 144. The following description should be read in view of FIGS. 1A-8.

Check valve assembly 100 is operatively arranged to selectively allow fuel to flow into fuel chamber 94 in axial direction AD1. Check valve assembly 100 is arranged at a first end of fuel chamber tube 92 and comprises seat 102, seal 104, check valve 106, spring 110, and component 112. Seat 102 comprises first axial side 102A and second axial side 102B. Seal 104 engages both axial sides of seat 102. Specifically, and as shown in FIG. 6, seal 104 is arranged adjacent to side 102A, wraps around a radially inward facing surface (through-bore) of seat 102, and is also arranged adjacent to side 102B. As such, seal 104 provides sealing engagement of seat 102 with section 60 of case 50, as well as sealing engagement of check valve 106, specifically surface 106A, with seat 102. Check valve 106 is operatively arranged to displace in axial direction AD1 and axial direction AD2 to allow passage of fuel into fuel chamber 94, as indicated by flow path FP2. Check valve 106 comprises surface 106A, which is operatively arranged to sealing engage with surface 102B via seal 104, and protrusion 108, which is operatively arranged to engage spring 110. Spring 110 biases check valve 106 into sealing engagement with seat 102. Component 112 engages spring 110. In some embodiments, spring 110 wraps concentrically around protrusion 108 and sits within an indentation in component 112. Component 112 and spring 110 work together to bias check valve 106 in axial direction AD1. In some embodiments, component 112 is connected to seat 102. Component 112 has a plurality of fingers that connect to seat 102 and allow for fluid to flow through component 112 in axial direction AD2. Spring 114 engages component 112 at a first end and seat 130 at a second end. Spring 114 is operatively arranged to bias plunger assembly 120 is axial direction AD2, as will be described in greater detail below. In some embodiments, spring 114 is frusto-conical. In some embodiments, spring 114 is a constant diameter helical spring.

Plunger assembly 120 is operatively arranged to selectively allow fuel to flow into through-bore 124 in axial direction AD1. Plunger assembly 120 is arranged at a second end of fuel chamber tube 92, opposite check valve assembly 100, and comprises tube 122, seat 130, component 134, plunger 138, and spring 144. As previously described, plunger assembly 120, specifically tube 122, comprises a magnetic metal (e.g., 416 stainless steel) that displaces relative to the magnetic field created by coil 152. Tube 122 comprises through-bore 124, seat 126, and seat 128. Seat 130 has a cylindrical portion and flange portion that extend radially inward from the cylindrical portion on a first end of the cylindrical portion. The second end of the cylindrical portion engages seat 126. In some embodiments, seat 130 is generally shaped like a brake drum of an automobile. Seat 130 comprises surface 132 which is arranged to engage plunger 138 to create a seal therebetween. Component 134 is arranged to engage seat 126. As shown in FIG. 7, component 134 is triangular shaped having a through-bore and curved radially outward facing surface apertures therein. Plunger 138 is generally arranged between seat 130 and component 134 and is connected to shaft 140 which is engaged with the through-bore of component 134. In a sealed state, plunger 138 is engaged with surface 132, thereby preventing fuel from entering through-bore 124 from fuel chamber 94. In an unsealed state, plunger 138 displaces away from surface 132 in axial direction AD2 with respect to seat 130 and component 134, thereby allowing fuel to flow through seat 130 and component 134 into through-bore 124, as indicated by flow path FP3 in FIG. 6. In some embodiments, a spring is arranged between component 134 and plunger 138 to bias plunger 138 into engagement with surface 132. Spring 144 is arranged to engage seat 128 at a first end, and recess 46 of cover 40 at a second end. Spring 144 is arranged to dampen the return displacement of tube 122. For example, when current provided to coil 152 is turned off, spring 114 displaces tube 122 in axial direction AD2. Spring 144 provides a buffer between tube 122 and cover 40, thereby preventing tube 122 from impacting the solid material of cover 40 and possibly damaging it.

When direct current (DC) power is applied to circuit 80 via terminals 82, the microcontroller on circuit 80 causes DC power to flow through coil 152 at frequencies that vary with the input voltage. One complete cycle of fuel pump 10 begins with circuit 80 causing one coil lead, namely, one of terminals 84, to be connected to ground through transistor 88. Coil 152, enhanced by the metal shielding surrounding it, namely, magnetic poles 154 and 156 and magnetic sleeve 158, urges plunger assembly, namely tube 122, in axial direction AD1 (i.e., towards filter bowl 20). During this movement, check valve assembly 100 is closed (i.e., surface 106A of check valve 106 is sealingly engaged with seat 102), plunger assembly 120 is open (i.e., plunger 138 is not sealingly engaged with surface 132), and fuel flows through seat 130, around plunger 138, through component 134, and into through-bore 124 as indicated by flow path FP3 in FIG. 6. It is the displacement of tube 122 in axial direction AD1 that forces plunger 138 off of surface 132 of seat 130, thereby allowing fuel to flow from fuel chamber 94 and into through-bore 124. Circuit 80 then disconnects the coil lead from ground causing the DC current to stop flowing through coil 152 and results in the collapse of the magnetic field. Spring 114 urges tube 122 and plunger assembly 120 in axial direction AD2 back toward its initial position, as shown in FIGS. 3 and 4. This movement, in axial direction AD2, causes check valve assembly 100 to open (i.e., surface 106A of check valve 106 disengages seat 102) allowing fuel to flow into fuel chamber 94 as indicated by flow path FP2, and plunger assembly 120 to close (i.e., plunger 138 sealingly engages surface 132 of seat 130). The fuel on the outlet side of plunger 138 (i.e., within and adjacent to through-bore 124) is forced towards outlet 42. Fuel in filter bowl 20 and filter 26 is pulled into fuel chamber 94 (i.e., via vacuum). Thus, displacement of plunger assembly 120 in axial direction AD1 via a magnetic force moves fuel from fuel chamber 94 into through-bore 124. Displacement of plunger assembly 120 in axial direction AD2 when the magnetic force is removed displaces fuel from through-bore 124 through outlet 42 as well as from filter bowl 20 into fuel chamber 94. This cycle is repeated at predetermined frequencies programmed into the microcontroller or manually operated via an external signal source.

It should be appreciated that the arrangement of fuel pump 10 allows filter 26 to be serviced without having to remove the plumbing connections at inlet 52 and outlet 42. It should also be appreciated that, while the present disclosure is directed at a pump for fuel, the fuel pump of the present disclosure can be used with any fluids in need of pumping, for example, water, paint, oil, etc., and the term "fuel" as used herein is intended to be synonymous with the term "fluid."

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fuel pump
20 Filter
22 Hub
24 Threading
26 Filter
28 Cage
30 Seal
40 Cover
42 Outlet
44 Protrusion
46 Recess or hole
48 Fitting
50 Case
52 Inlet 54 Fitting
56 Section
58 Threading
60 Section
62 Hub
64 Space or chamber
66 Hole
68 Fuel chamber
70 Housing chamber
72 Connector port
80 Circuit
82 Terminal(s)
84 Terminal(s)
90 Valve assembly
92 Fuel chamber tube
94 Fuel chamber
100 Check valve assembly
102 Seat
102A Side
102B Side
104 Seal
106 Check valve
106A Surface
108 Protrusion
110 Spring
112 Component
114 Spring
120 Plunger assembly
122 Tube
124 Through-bore
126 Seat
128 Seat
130 Seat
132 Surface
134 Component
136 Surface
138 Plunger
140 Shaft
142 Surface
144 Spring
150 Coil bobbin
151 Retainer
152 Coil
154 Pole
156 Pole
158 Sleeve
FP1 Flow path
FP2 Flow path
FP3 Flow path
AD1 Axial direction
AD2 Axial direction

What is claimed:

1. A fuel pump, comprising:
a case, including:
   a first section comprising a first hub and a hole;
   a second section, the second section including a threaded portion and circumferentially arranged around the first section, wherein a radial space is arranged between the first section and the second section;
   an inlet in fluid communication with the radial space;
   a housing chamber arranged adjacent to the first section; and
   an outlet in fluid communication with the hole;
a transparent filter bowl removably connected by way of the threaded portion to the second section, the transparent filter bowl disposed outside the case and providing a fuel path from the inlet, out from the case, into the transparent filter bowl, and back into the case, the transparent filter bowl fluidly connecting the radial space with the hole and axially extended from the second section;
a filter engaged with the first hub, the filter partially arranged in the transparent filter bowl and positioned slidably and circumferentially around the first hub and a second hub;
a support cage engaged with the first hub and the second hub, the support cage adapted to ensure proper alignment and positioning of the filter;
a valve assembly arranged at least partially in the first section and at least partially in the housing chamber;
a coil operatively arranged to apply a magnetic field to the valve assembly to selectively displace fluid therethrough;
a spring arranged axially between a shoulder and a first metal pole adapted to maintain proper positioning of a coil bobbin and the coil in the housing chamber, and
a circuit arranged around the valve assembly within the housing chamber, the circuit connected to the coil, wherein the circuit includes a microcontroller operatively arranged to control current supplied to the coil.

2. The fuel pump as recited in claim 1, further comprising a bobbin arranged concentrically around the valve assembly, wherein the coil is arranged concentrically around the bobbin.

3. The fuel pump as recited in claim 2, further comprising:
the first metal pole arranged on a first axial side of the coil;
a second metal pole arranged on a second axial side of the coil, opposite the first axial side of the coil; and
a metal sleeve arranged circumferentially around the coil.

4. The fuel pump as recited in claim 1, wherein the case further comprises a port electrically connected to the circuit.

5. The fuel pump as recited in claim 1, wherein the valve assembly comprises:
a fuel chamber tube including a first end and a second end;
a check valve assembly arranged in the fuel chamber tube at the first end of the fuel chamber tube; and
a plunger assembly slidably arranged in the fuel chamber tube at the second end of the fuel chamber tube.

6. The fuel pump as recited in claim 5, wherein the check valve assembly comprises:
a first seat including a first side and a second side;
a first component axially spaced from the first seat;
a check valve displaceably arranged between the first seat and the first component; and
a first spring operatively arranged to bias the check valve in a first axial direction, towards the first seat.

7. The fuel pump as recited in claim 6, wherein the check valve assembly further comprises a seal, the seal being integrally formed and engaged with both the first side and the second side of the first seat.

8. The fuel pump as recited in claim 6, wherein the plunger assembly comprises:
a tube including a second seat, a third seat, and a through-bore;
a fourth seat engaged with the second seat and including a radially inward facing surface;
a second component engaged with the second seat; and
a plunger displaceably arranged between the fourth seat and the second component.

9. The fuel pump as recited in claim 8, wherein the check valve assembly further comprises a second spring arranged in a fuel chamber between the check valve assembly and the plunger assembly to bias the plunger assembly in a second axial direction, opposite the first axial direction.

10. The fuel pump as recited in claim 9, wherein the second spring is frusto-conical.

11. The fuel pump as recited in claim 9, wherein:
when the plunger assembly is displaced in the first axial direction, the check valve sealingly engages the first side of the first seat and the plunger is spaced apart from the radially inward facing surface of the fourth seat allowing fluid flow into the through-bore; and
when the plunger assembly is displaced in the second axial direction, the plunger is sealingly engaged with the radially inward facing surface of the fourth seat and the check valve is spaced apart from the first side of the first seat, allowing fluid flow into the fuel chamber.

12. The fuel pump as recited in claim 1, wherein the transparent filter bowl is operatively arranged to secure the filter to the case.

13. A fuel pump, comprising:
a case, including:
a first section comprising a first hub and a hole;
a second section, the second section including a threaded portion and concentrically arranged around the first section, wherein a radial space is arranged between the first section and the second section;
an inlet in fluid communication with the radial space;
a housing chamber arranged adjacent to the first section and the second section; and
an outlet in fluid communication with the hole;
a transparent filter bowl removably connected by way of the threaded portion to the second section, the transparent filter bowl disposed outside the case and providing a fuel path from the inlet, out from the case, into the transparent filter bowl, and back into the case, the transparent filter bowl fluidly connecting the radial space with the hole and axially extended from the second section;
a filter engaged with the first hub, the filter partially arranged in the transparent filter bowl and positioned slidably and circumferentially around the first hub and a second hub;
a support cage engaged with the first hub and the second hub, the support cage adapted to ensure proper alignment and positioning of the filter;
a valve assembly arranged at least partially in the first section and at least partially in the housing chamber, the valve assembly including:
a fuel chamber tube comprising a first end and a second end;
a check valve assembly arranged in the fuel chamber tube at the first end of the fuel chamber tube; and
a plunger assembly slidingly arranged in the fuel chamber tube at the second end of the fuel chamber tube;
a solenoid coil concentrically arranged around the plunger assembly, the solenoid coil operatively arranged to produce a magnetic field to displace the plunger assembly in a first axial direction such that fluid is selectively displaced from the inlet to the outlet;
a spring arranged axially between a shoulder and a pole adapted to maintain proper positioning of a coil bobbin and the solenoid coil in the housing chamber, and
a circuit arranged around the valve assembly within the housing chamber, the circuit connected to the solenoid coil, wherein the circuit includes a microcontroller operatively arranged to control current supplied to the solenoid coil.

14. The fuel pump as recited in claim 13, wherein the check valve assembly comprises:
a first seat including a first side and a second side;
a seal of the first seat integrally formed and engaged with both the first side of the first seat and the second side of the first seat;
a first component axially spaced from the first seat;
a check valve displaceably arranged between the first seat and the first component; and
a first spring operatively arranged to bias the check valve in the first axial direction, towards the first seat.

15. The fuel pump as recited in claim 14, wherein the plunger assembly comprises:
a tube including a through-bore;
a second seat engaged with the tube and including a radially inward facing surface;
a second component engaged with the tube; and
a plunger displaceably arranged between the second seat and the second component;
wherein a second spring is arranged between the plunger assembly and the check valve assembly to bias the plunger assembly in a second axial direction, opposite the first axial direction.

16. The fuel pump as recited in claim 15, wherein:
when the plunger assembly is displaced in the first axial direction, the check valve sealingly engages the first side of the first seat and the plunger is spaced apart from the radially inward facing surface of the second seat allowing fluid flow into the through-bore; and
when the plunger assembly is displaced in the second axial direction, the plunger is sealingly engaged with the radially inward facing surface of the second seat and the check valve is spaced apart from the first side of the first seat allowing fluid flow into the fuel chamber.

17. A fuel pump, comprising:
a case, including:
a first section comprising a first hub and a hole;
a second section, the second section including a threaded portion and concentrically arranged around the first section, wherein a radial space is arranged between the first section and the second section;
an inlet in fluid communication with the radial space;
a housing chamber arranged adjacent to the first section and the second section; and
an outlet in fluid communication with the hole;
a filter removably connected to the first hub;
a transparent filter bowl removably connected by way of the threaded portion to the second section and operatively arranged to secure the filter to the case, the transparent filter bowl disposed outside the case and providing a fuel path from the inlet, out from the case, into the transparent filter bowl, and back into the case, the transparent filter bowl fluidly connecting the radial space with the hole and axially extended from the second section;
the filter engaged with the first hub, the filter partially arranged in the transparent filter bowl and positioned slidably and circumferentially around the first hub and a second hub;
a support cage engaged with the first hub and the second hub, the support cage adapted to ensure proper alignment and positioning of the filter;
a valve assembly arranged at least partially in the first section and at least partially in the housing chamber, the valve assembly including:

a fuel chamber tube comprising a first end and a second end;

a check valve assembly arranged in the fuel chamber tube at the first end of the fuel chamber tube; and a plunger assembly slidingly arranged in the fuel chamber tube at the second end of the fuel chamber tube; and a solenoid coil concentrically arranged around the plunger assembly, the solenoid coil operatively arranged to produce a magnetic field to displace the plunger assembly in a first axial direction such that fluid is selectively displaced from the inlet to the outlet;

a spring arranged axially between a shoulder and a pole adapted to maintain proper positioning of a coil bobbin and the solenoid coil in the housing chamber, and a circuit arranged around the valve assembly within the housing chamber, the circuit connected to the solenoid coil, wherein the circuit includes a microcontroller operatively arranged to control current supplied to the solenoid coil.

\* \* \* \* \*